United States Patent
Song et al.

(10) Patent No.: US 6,594,048 B1
(45) Date of Patent: Jul. 15, 2003

(54) TECHNIQUE TO OBTAIN CHANNEL PLANS FOR WDM SYSTEMS WITH REDUCED FOUR-WAVE MIXING EFFECT

(75) Inventors: Shuxian Song, Baltimore, MD (US); Michael Taylor, Laurel, MD (US)

(73) Assignee: Ciena Corporation, Lithicum, MD (US)

( * ) Notice: Subject to any disclaimer, the term of this patent is extended or adjusted under 35 U.S.C. 154(b) by 0 days.

(21) Appl. No.: 09/551,142

(22) Filed: Apr. 17, 2000

Related U.S. Application Data

(60) Provisional application No. 60/130,884, filed on Apr. 23, 1999.

(51) Int. Cl.[7] .................................................. H04J 14/02
(52) U.S. Cl. ........................ 359/124; 359/110; 359/161
(58) Field of Search ............................ 359/124, 110, 359/161

(56) References Cited

U.S. PATENT DOCUMENTS

| | | | |
|---|---|---|---|
| 5,696,614 A | * | 12/1997 | Ishikawa et al. ............. 359/124 |
| 6,118,563 A | * | 9/2000 | Boskovic et al. ............. 359/124 |
| 6,407,842 B1 | * | 6/2002 | Ma ................................. 359/173 |

FOREIGN PATENT DOCUMENTS

| EP | 0668675 A | 8/1995 | ..................... 14/2 |
|---|---|---|---|

OTHER PUBLICATIONS

Hwang, B., et al., "A Generalized Suboptimum Unequally Spaced Channel Allocation Technique—Part I: INIM/DD WDM Systems", IEEE Transactions on Communications, US, IEEE Inc., New York, vol. 46, p. 1027–1037.

Kwong, W. C., et al., "Allocation of Unequal—Spaced Channels in WDM Lightwave Systems", Electronics Letters, GB, IEE Stevenage, vol. 31, p. 898–899.

* cited by examiner

*Primary Examiner*—Kinfe-Michael Negash
(74) *Attorney, Agent, or Firm*—David Soltz; Daniel Daisak

(57) ABSTRACT

A technique in accordance with the present invention provides a systematic approach to find a sub-optimum channel plan with reasonable computational time. In each step, this technique allocates channels to minimize the FWM crosstalk in terms of fiber characteristics, while selecting as many channels as possible to increase the bandwidth efficiency.

8 Claims, 15 Drawing Sheets

TECHNIQUE TO OBTAIN CHANNEL PLANS FOR WDM SYSTEMS WITH REDUCED FOUR-WAVE MIXING EFFECT

The present application claims the benefit of U.S. Provision Patent Application Ser. No. 60/130,884, filed Apr. 23, 1999.

FIELD OF INVENTION

A new technique for acquiring channel plans in wavelength-division multiplexing (WDM) systems is disclosed. This technique allocates channels from available channel slots by minimizing four-wave mixing (FWM) crosstalk and taking into account fiber characteristics. It can provide channel plans for WDM systems in single-mode fiber with a non-uniform dispersion profile along the transmission path.

BACKGROUND

With the wide deployment of dense wavelength-division multiplexing (DWDM) systems, intensity-dependent nonlinear effects in low dispersion optical fiber have become a significant issue, in which four-wave mixing (FWM) is of particular concern due to the large number of channel counts and narrow channel spacing in the DWDM systems. To reduce the FWM effect, channel plans with unequal channel spacing have been used. These channel plans can be classified into two categories: the zero-FWM channel plans; and the non-zero-FWM channel plans. The zero-FWM plans do not have any FWM products falling onto signal channels and thus significantly reduce FWM effects. However, to achieve this, substantial usable bandwidth is sacrificed and extremely low bandwidth efficiency results. Moreover, if the given channel slots are fixed to ITU grids, the number of channels in a zero-FWM channel plan is quite limited.

The non-zero-FWM plans allow some FWM products to fall onto the signal channels, but with maximum level of FWM crosstalk is less than the required limit. These channel plans obviously have clear advantage over the zero-FWM plans in realizing that it is not necessary to achieve zero FWM in an actual WDM systems as long as the FWM crosstalk level does not limit the system performance. The bandwidth efficiency is dramatically increased in non-zero FWM channel plans. However, due to the large number of channels and the complex relation between channels and FWM products, obtaining an optimum unequally spaced non-zero-FWM channel plan is not an easy task. If the fiber characteristics are considered in the procedure, the problem becomes even more complex.

A periodic allocation method has been proposed to obtain the non-zero-FWM channel plans. In this method, the entire available optical bandwidth (usually limited by the optical amplifiers) is divided into multiple sub-bands. In each sub-band, a zero-FWM channel plan is obtained. A guard band is allocated between adjacent sub-bands to reduce FWM produced by channels in different sub-bands. The FWM crosstalk is significantly reduced in channel plans obtained using this method compared to the equally spaced channels, because no FWM crosstalk is produced inside each sub-band and also a large separation exists between channels in different sub-bands. However, this method is far from optimum since it does not consider fiber dispersion at different channel wavelengths. In addition, the periodic allocation method is counter-intuitive since a larger dispersion region should have more channels and a zero-dispersion region should have less channels.

Recently, another method has been proposed to obtain unequally spaced channel plans with non-zero FWM. This method minimizes the FWM products that fall onto signal channels under constraint of a given bandwidth expansion ratio. A sequence is produced which represents the channel spacing between channels in the desired channel plans. The optimization is performed by manipulating this sequence to reduce the number of FWM products. The advantage of this method is that the resulting channel plan satisfies the required bandwidth expansion factor. However, a drawback associated with this method is that this expansion factor usually is quite large, (1+N/2) for an N-channel plan. Also, the resulting channel plan may not satisfy the required FWM limit. Moreover, this algorithm does not consider the fiber characteristics, i.e., fiber dispersion. Minimizing FWM products does not necessarily minimize the FWM crosstalk since the FWM efficiency strongly depends on the fiber dispersion and channel spacing.

An exhaustive computer search may be another choice for selecting a channel plan. However, due to the large number of channels in DWDM systems, the possible combinations of the channels in forming a channel plan is so large that it is prohibitive to use this approach. For example, if a 40-channel plan is selected from a 96-channel WDM system, the number of possible choices is $1.3 \times 10^{27}$. Clearly, it is impossible to try every combination to find the optimum channel plan.

Upgrading an existing WDM system presents additional challenges for channel allocation. With the dramatic increase in demand for transmission capacity from, for example, internet applications, the channel counts of WDM systems have correspondingly increased. Transmission systems have thus evolved from normal WDM systems to dense WDM systems, and to current ultra-dense WDM systems. However, increasing capacity does not mean simply replacing the old system with a new one. In many instances, the capacity is increased through upgrading, i.e., adding more channels to the system without changing the old channels. Network operators prefer upgrading because it is less expensive than purchasing a new system and does not require network rearrangement. However, upgrading channel plans does not mean merely adding channels arbitrarily in the remaining available channel slots. With the increased number of channels and the decreased channel spacing, intensity-dependent nonlinear crosstalk in low dispersion optical fiber (dispersion-shifted fiber (DSF) and non-zero-dispersion-shifted fiber (NZ-DSF)) have become significant issues, in which FWM is of particular concern. Different channel plans yield different system performance and capacities. A desirable upgrade channel plan should include as many channels as possible while minimizing FWM crosstalk.

However, it is not an easy task to upgrade an old channel plan to a new channel plan with minimized FWM effect. Most current channel allocating schemes do not include the constraint that the new channel plan should include the old channel plan. As described above, the periodically allocating method obtains the channel plans by periodically allocating channels. However, this technique is hard to use for upgrading a channel plan since including the old channels may destroy the periodic allocation.

Another method to obtain unequally spaced channel plans, as described above proposes to minimize the FWM products that fall onto signal channels. This method uses a sequence as the channel spacings between channels in the desired channel plans. This method obviously is difficult to perform when upgrading, since manipulating the channel-spacing sequence is not compatible with the old channel plan that has fixed channel spacings between channels.

Recently, another new method was presented to obtain channel plans in minimizing FWM effect while considering fiber characteristics. In accordance with this alternative method, a channel plan is obtained by dropping those channels with maximum FWM crosstalk. This approach has yielded channel plans better than those obtained with the above-described methods. However, it can not be used for upgrading channel plan from an existing channel plan.

As noted above, an exhaustive computer search may be used to obtain a channel plan. This approach tries all the channel combinations for the desired channel number, of which the old channel plan is a subset. Again, performing this process is extremely difficult for WDM systems with large numbers of channels, because the number of possible combinations is so large for the given number of channels. For example, to upgrade from 11 channels 32 in a WDM system capable of carrying 96 channel total, $4.34 \times 10^{19}$ possible channel plans must be analyzed in order to determine the one with the least FWM crosstalk. This task is clearly prohibitive.

SUMMARY OF THE INVENTION

A technique in accordance with the present invention provides a systematic approach to find a sub-optimum channel plan with reasonable computational time. In each step, this technique allocates channels to minimize the FWM crosstalk in terms of fiber characteristics, while selecting as many channels as possible to increase the bandwidth efficiency. Since FWM crosstalk depends on fiber dispersion, channel spacing, channel power and number of FWM products, if FWM crosstalk is minimized, it means that the channel plan selected is optimal on all these parameters.

BRIEF DESCRIPTION OF THE DRAWINGS

Advantages of the present invention will be apparent from the following detailed description of the presently preferred embodiments thereof, which description should be considered in conjunction with the accompanying drawings in which.

DESCRIPTION OF THE INVENTION

Figure 1:
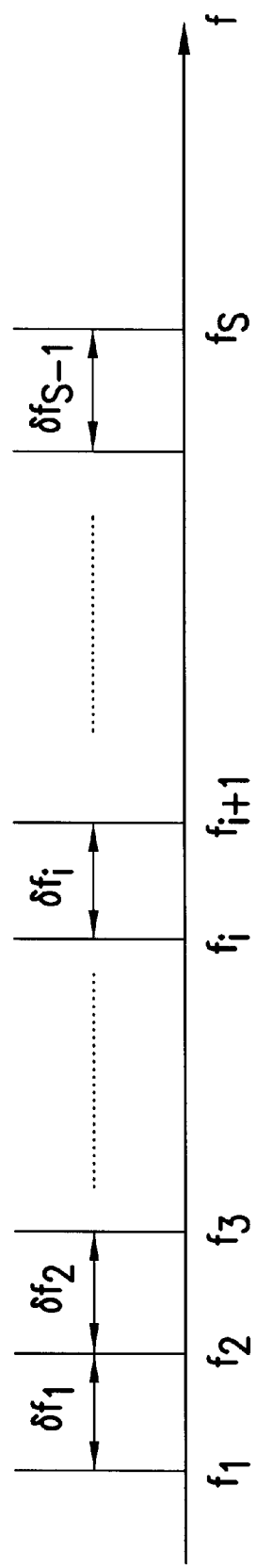
FIG. 1 illustrates exemplary channel slots available in a WDM system.

The channel slots for a given WDM system are shown in FIG. 1. It has S channel slots with $\Delta f_i$ as the frequency separation between the i-th and the (i+1)-th slot. The available channel slots are not necessarily equally spaced. The first channel frequency is $f_1$. The goal of the channel plan allocating technique consistent with the present invention is to maximize the number of channels, while keeping the maximum FWM among the channels at a minimum.

Figure 2:
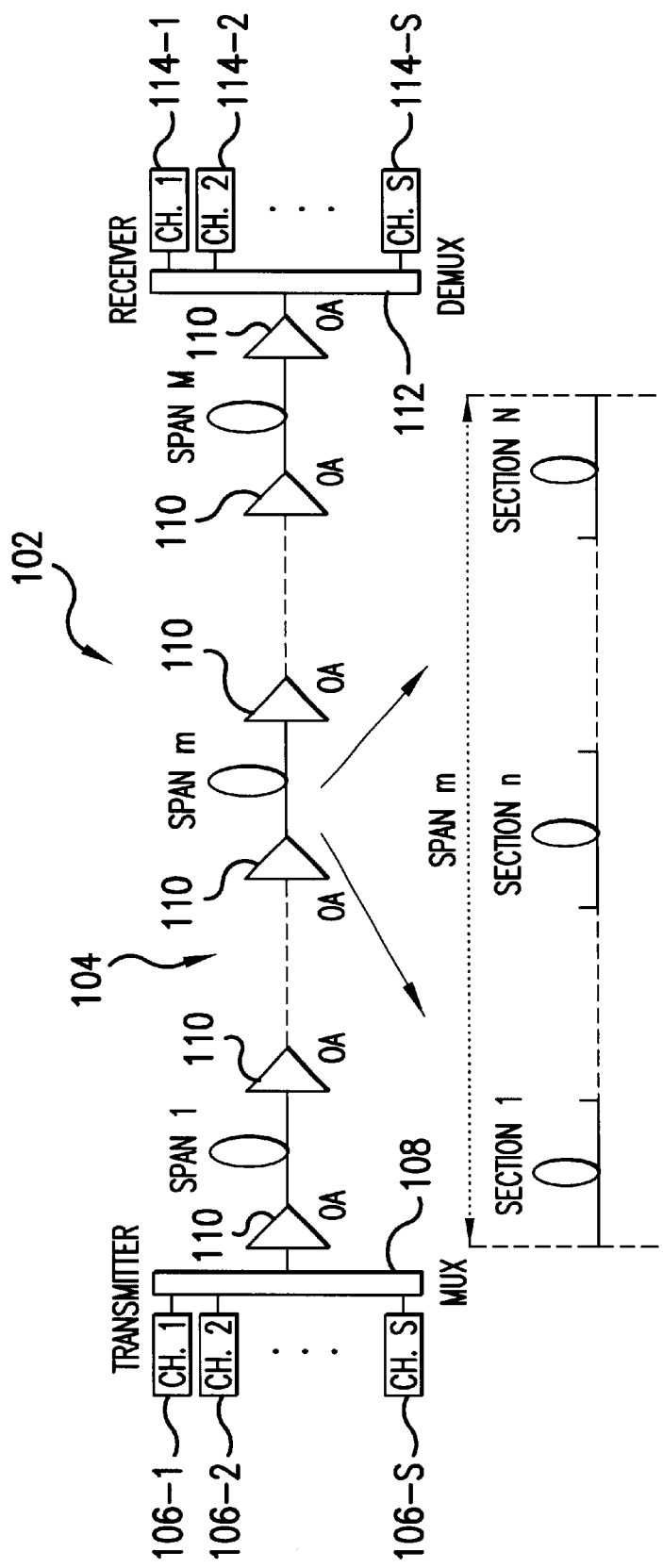
FIG. 2 is a schematic diagram of a WDM system.

The transmission system is given in FIG. 2, which is a multiple span wavelength division multipelxed (WDM) system 102, where the fiber link 104 is composed of M spans with each span having N fiber sections. Each fiber can have different dispersion, i.e., non-uniform dispersion. This is usually the case for the installed fiber. The total number of channels in this system is S as given above.

Each channel is supplied by a respective one of transmitters 106-1 to 106-S, and combined ont fiber link 104 by a multiplexer 108. A series of optical amplifiers 110 are interspersed along fiber line 104 to amplify the transmitted optical signals. At the receive end, a demultipliexer 112 separates the individual channels, and supplies them to respective receivers 114-1 to 114-S.

FWM is a nonlinear process in which three optical signals mix together and produce a new frequency product. Assuming that the three optical signals have frequencies, $f_p$, $f_q$, and $f_r$, then the new FWM product from these three signals has a frequency $f_F$, where $$f_F = f_p + f_q - f_r \quad (1)$$

The time-average power of the FWM product at $f_F$ can be expressed by:

$$P_{FWM} = \frac{1024\pi^6}{n_0^4 \lambda^2 c^2}(D\chi)^2 \frac{P_p P_q P_r}{A_{\textit{eff}}} \exp(-\alpha L) \cdot \quad (2)$$

$$\left| \sum_{m=1}^{M} \left\{ \exp\left[i \sum_{k=1}^{m-1} (\Delta \phi^{(k)}) + i\gamma(P_r^{(ml)} - P_p^{(ml)} - P_q^{(ml)}) \right. \right. \right.$$

$$\left. (m-1)\frac{1-\exp(-\alpha L)}{\alpha}\right] \cdot$$

$$\sum_{n=1}^{N} \left\{ \exp\left[\left(\sum_{j=1}^{n-1}(-\alpha + i\Delta\beta^{(mj)})L_0\right]\right.\right.$$

$$\left.\exp\left[i\gamma(P_r^{(ml)} - P_p^{(ml)} - P_q^{(ml)})\frac{1-\exp(-\alpha L_0(n-1))}{\alpha}\right]\cdot\right.$$

$$\left.\left.\left.\frac{1-\exp[(-\alpha+i\Delta\beta^{(mn)})L_0]}{\alpha - i\Delta\beta^{(mn)}}\right\}\right\}\right|^2$$

where the parameters are given as follows:

$n_0$—The fiber core refractive index.

$\lambda$—The wavelength at frequency $f_r$.

D—The degenerate factor for FWM, D=6 if p≠q, D=3 if p=q.

χ—The third-order nonlinear susceptibility of the fiber.

$P_p$—The input channel power at frequency $f_p$.

$P_q$—The input channel power at frequency $f_q$.

$P_r$—The input channel power at frequency $f_r$.

α—The fiber loss coefficient.

L—Length of one span.

M—Number of spans.

$\Delta\phi^{(k)}$—The phase difference between the four signals ($f_p$, $f_q$, $f_r$, and $f_F$) due to the fiber dispersion.

γ—The nonlinear coefficient of the fiber.

$P_i^{(mn)}$—The signal power to the n-th fiber section in the m-th span for the four signals (i=p, q, r, F).

N—The number of fiber sections in one span.

$\Delta\beta^{(mj)}$—The phase match factor at the j-th fiber section of the m-th span.

$L_0$—Length of one fiber section $\Delta\beta'^{(mn)}$—The intensity dependent phase match factor at the n-th fiber section of the m-th span.

The expressions for the phase difference between the four signals ($f_p$, $f_q$, $f_r$, and $f_F$) is given as $$\Delta\phi^{(k)} = \phi_p^{(k)} + \phi_q^{(k)} - \phi_r^{(k)} - \phi_F^{(k)} \quad (3)$$

where $\phi_i^{(k)}$ (i=p, q, r, F) are the propagation phases at the k-th span for the four signals and written as $$\phi_i^{(k)} = \sum_{n=1}^{N} \beta_i^{(kn)} L_0^{(kn)} \quad (i = p, q, r, F) \quad (4)$$

with k representing the k-th span. The intensity dependent phase-matching factor for FWM is given as $$\Delta\beta'^{(mn)} = \Delta\beta^{(mn)} - \gamma(P_p^{(mn)} + P_q^{(mn)} - P_r^{(mn)})1 - \frac{\exp(-\alpha L_{eff})}{\alpha L_{eff}} \quad (5)$$

where $\Delta\beta^{(mn)}$ is the phase-matching factor depending only on fiber dispersion and channel spacing and written as $$\Delta\beta^{(mn)} = \frac{2\pi\lambda_r^2}{c}\Delta f_{pr}\Delta f_{qr}\left[D_c^{(mn)} + \frac{\lambda_r^2}{2c}(\Delta f_{pr} + \Delta f_{qr})\frac{dD_c^{(mn)}(\lambda_r)}{d\lambda}\right] \quad (6)$$

where $D_c^{(mn)}$ is the local fiber dispersion and $dD_c^{(mn)}/d\lambda$ is the local dispersion slope in the n-th fiber section of the m-th span. The channel separations, $\Delta f_{pr}$, $\Delta f_{qr}$, are defined as $$\Delta f_{pr} = f_p - f_r,$$

$$\Delta f_{qr} = f_q - f_r. \quad (7)$$

The power terms, $p_p^{(mn)}$, $P_q^{(mn)}$ and $P_r^{(mn)}$ are the input power to the section n in span m for the three pump signals, respectively.

The nonlinear coefficient of the fiber, γ, is defined as $$\gamma = \frac{n_2 \omega_1}{c A_{eff}} \quad (8)$$

where $n_2$ is the nonlinear refractive index of the fiber core, $A_{eff}$ is the effective fiber core area, ω is the angle frequency of the FWM product, and c is the light speed at free space.

In formulating (1), it is assumed that all channels have the same polarization direction. If the channel signals are randomly polarized and independent with each other, the FWM power is decreased to half for degenerate FWM and ⅜ for non-degenerate FWM. Also, the intensity dependent phase-matching for FWM in (1) only becomes significant when channel power exceeds 10 dBm. In most DWDM systems, the channel power is significantly below this level. Therefore, the intensity terms in (1) have been factored into the above calculations.

By using (1), the FWM power for one product can be calculated and the total FWM power of one channel is the sum of the power from all the FWM products falling onto that channel, i.e., $$P_{Ftotal} = \frac{1}{8}\sum_{p\neq q\neq r} P_{FWM}(p,q,r) + \frac{1}{4}\sum_{p=q\neq r} P_{FWM}(p,q,r) + \frac{1}{4}\sum_{p\neq q\neq r=F} P_{FWM}(p,q,r). \quad (9)$$

The FWM crosstalk in the s-th channel in the WDM system is defined as the ratio of total FWM product power to the signal power in that channel, $$C^{(s)} = \frac{P_{total}}{P^{(s)}} \quad (10)$$

An objective of a channel allocation technique consistent with the present invention is to minimize this crosstalk while selecting as many channels as possible.

For a given number of channel slots S, the final goal is to find a channel plan with $S_c$ channels or with a maximum FWM crosstalk less than $C_c$. The allocating process are given as following:

Step 1. Calculate the FWM power matrix by using formula (2). The FWM power matrix is defined as $$P_{matrix}(p,q,r) = P_{FWM}(f_p, f_q, f_r), (p, q, r=1, 2, \ldots, S). \quad (11)$$

This matrix has three dimensions and includes all possible combinations between any three channels in the system.

Step 2. Use the FWM power matrix to calculate the FWM crosstalk for all the channels and form a FWM crosstalk vector: $C^{(1)}, C^{(2)}, \ldots, C^{(S)}$. Since the FWM crosstalk is calculated by table look-up method form the FWM power matrix, the computation time is dramatically decreased compared with calculation directly from formula (2).

Step 3. Select the channel with the maximum FWM crosstalk level in the crosstalk vector and drop that channel to form a new channel plan. If $$C_{max} = \max(C^{(1)}, C^{(2)}, \ldots, C^{(S)}) = C^{(i)}$$

then the i-th channel is dropped and the new channel plan is $$f_1, f_2, \ldots, f_{i-1}, f_{i+1}, \ldots, f_s.$$

Step 4. The same as step 2, use the FWM power matrix to calculate the FWM crosstalk for all the channels in the new channel plans obtained in step 3 and form a FWM crosstalk vector: $C^{(1)}, C^{(2)}, \ldots, C^{(S-1)}$.

Step 5. Check the maximum FWM crosstalk and the number of remaining channels. If the maximum FWM crosstalk falls below a predetermined acceptable limit, or the number of remaining channels is exceeds the required number of channels, then go to next step. Otherwise, go back to step 3. That is, if $$S-1 \leq S_c$$

or $$C_{max} = \text{Max}(C^{(1)}, C^{(2)}, \ldots, C^{(S-1)}) \leq C_c,$$

go to Step 6. Otherwise, go to Step 3 with S=S−1.

Step 6. The remaining channels are the final channel plan:

$$f_1, f_2, \ldots, f_{S_c},$$

which is optimized to the FWM crosstalk. This channel plan can be evaluated for different fiber characteristics.

Since this technique drops the channel with maximum FWM crosstalk in each optimizing step, the obtained channel plan is optimal in each step, though it may not be totally optimal as all steps combined. Therefore, the obtained channel plan can be referred to as sub-optimum. The calculation time required for this technique, however, is dramatically reduced compared to the conventional exhaustive computer search. For example, selecting a 40-channel plan from 96 channels only requires 338 FWM-crosstalk calculations (normalized to the amount of calculation for 40 channels) by using this technique while the number of calculations is $1.3 \times 10^{27}$ when the exhaustive search method is used. Significant reduction in calculation is obtained.

Now, the channel allocating technique will be applied, by way of example, to assign 40 channels in a DWDM system with 96 channel slots. The system parameters are as follows:

Available channel slots: 96

Channel spacing: 0.4 nm

Span power budget: 6×20 dB (six spans with 20 dB each span, −8.5 dB/ch)

Fiber type: dispersion-shifted fiber (DSF)

Average zero-dispersion wavelength: 1550 nm

Average dispersion slope: 0.07 ps/km-nm²

Fiber effective core area: 50 $\mu m^2$

Fiber nonlinear index: $2.6 \times 10^{-20}$ m²/W

To characterize the non-uniformity of the fiber dispersion, a random zero-dispersion wavelength and a random dispersion slope are used for each fiber section. The distribution function follows Gaussian distribution. The standard deviation of the zero-dispersion wavelength is 2 nm. The standard deviation of dispersion slopes is ten percent of the average dispersion slope. Given the zero-dispersion wavelength and the dispersion slope in each fiber section, the dispersion at each channel can be calculated by using $$D(\lambda) = D_0 + (\lambda - \lambda_0) D_{slope} \quad (12)$$

The other system and fiber parameters can also be non-uniform along the link and the channel allocating techniques has no limitation on these parameters. But here, for simplicity, it is assumed that the remaining parameters are uniform.

Figure 3:
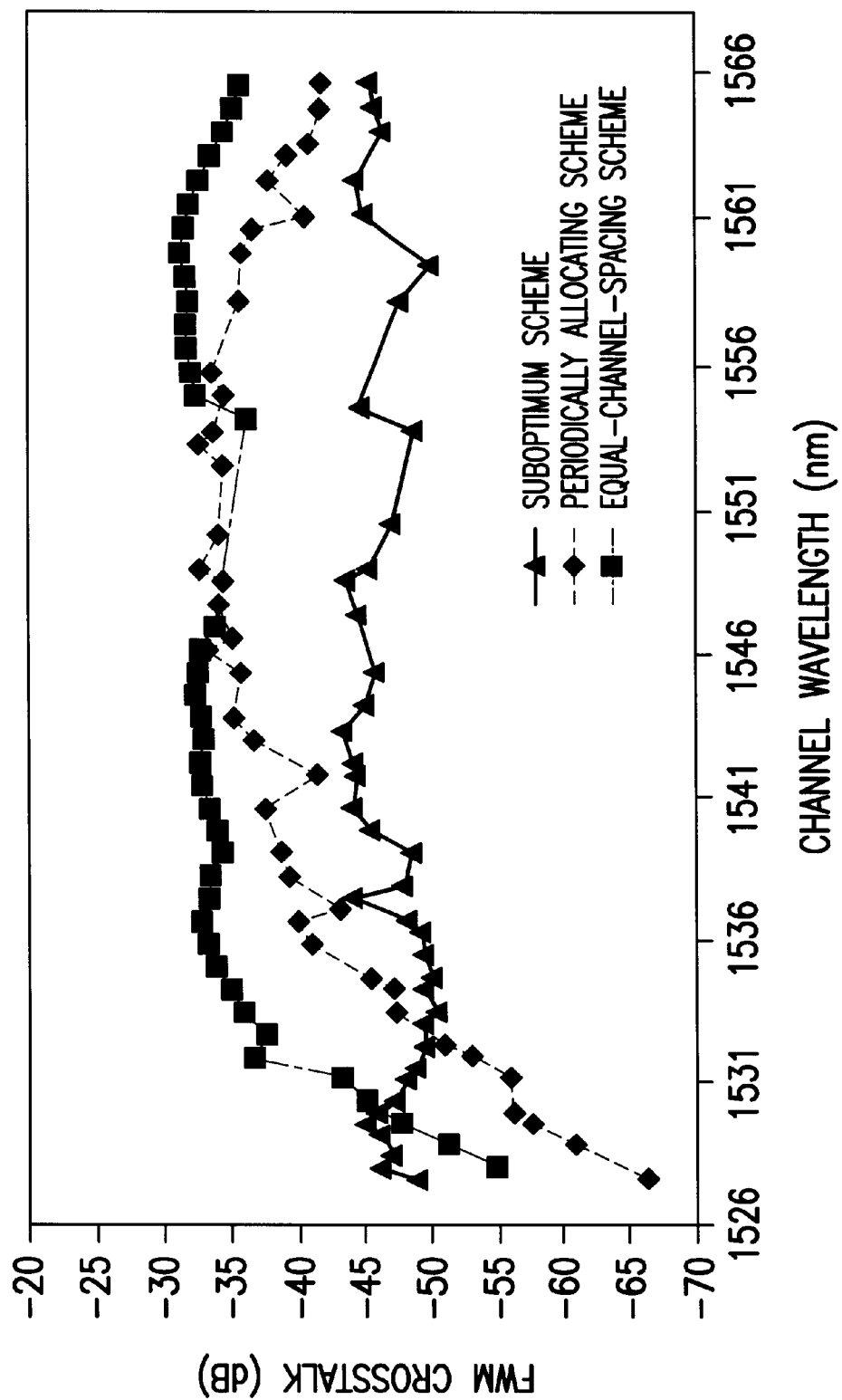
FIG. 3 illustrates plots of FWM crosstalk vs. wavelength for different channel plans.

FIG. 3 gives the channel plan with 40 channels plus the FWM crosstalk levels for each channel. To more clearly illustrate the advantages of the present invention, FWM crosstalk for the channel plan associated with the conventional periodically allocating technique and the two-band equal-channel-spacing scheme (in which the minimum channel separation is doubled and the channels close to the zero-dispersion wavelength are dropped) are also plotted. It is clearly seen that the channel plan from this technique has the lowest maximum FWM crosstalk. The advantage of this channel plan over the other two on FWM crosstalk can be as large as 10 dB. Also, by comparing the FWM crosstalk levels among channels in the channel plan, it can be seen that the FWM crosstalk in the channel plan consistent with the present invention is more flat than the other two channel plans. This may be due to the mechanism in this technique to optimize the FWM crosstalk and explain the better performance of this technique compared to other channel allocating techniques.

Figure 4:
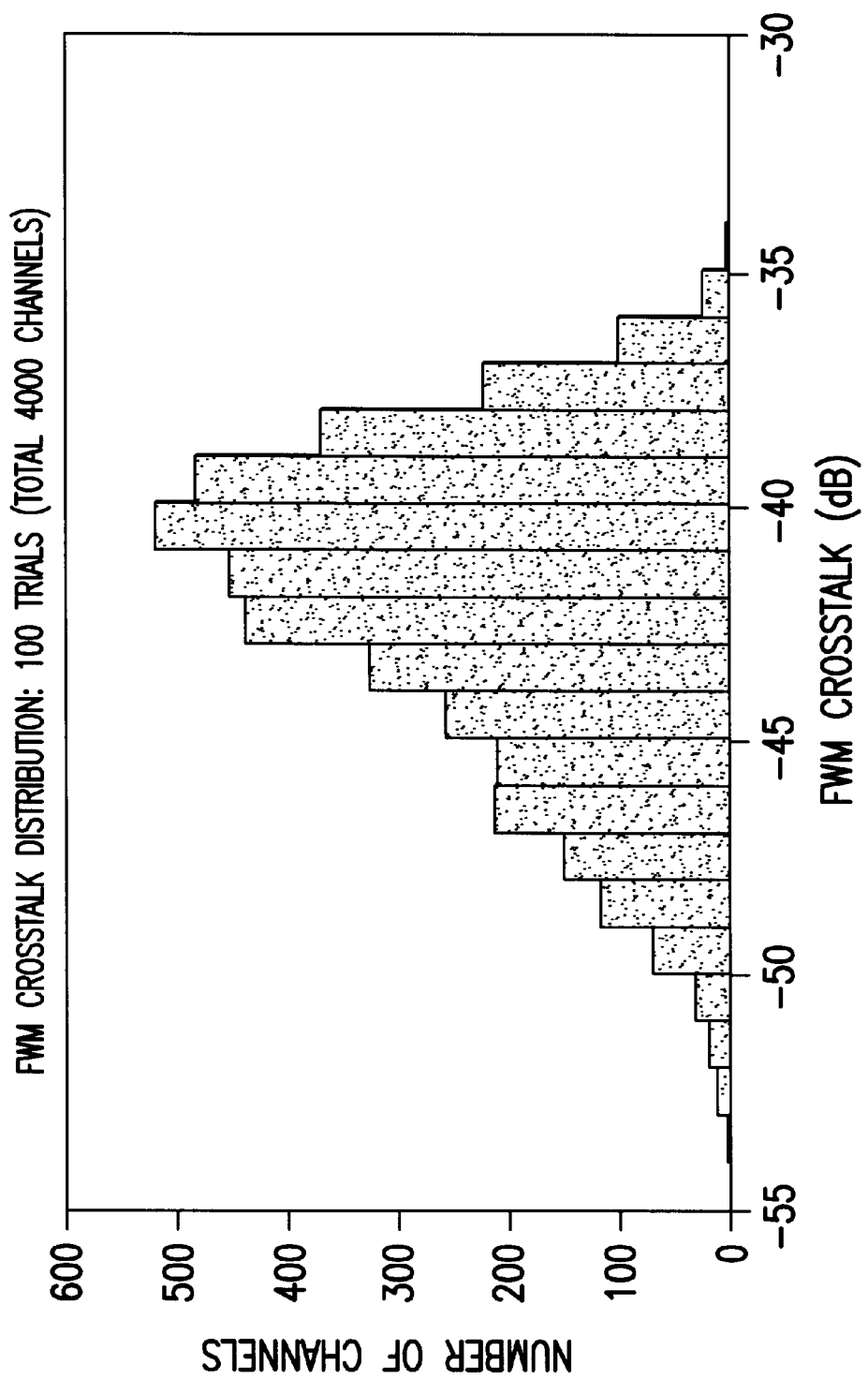
FIG. 4 is a histogram plot of FWM crosstalk for a channel plan consistent with the present invention for a 100 fiber link system.

To further illustrates the present invention, an exemplary channel was determiend for 100 different DSF links, each with the same system parameters as above except for the fiber zero-dispersion wavelength and dispersion slope, which are set randomly in Gaussian distributions. For the zero-dispersion wavelength, the mean is 1550 nm and standard deviation is 2 nm. For dispersion slope, the mean is 0.07 ps/km-nm and the standard deviation is ten percent of the mean. The FWM crosstalk for all the fiber links (trials) is plotted as a histogram, shown in FIG. 4. As expected, the maximum FWM crosstalk is increased for some fibers though the average value for all the fibers is close to the optimized maximum FWM crosstalk level. It means that the channel plan obtained by using this technique is sensitive to fiber characteristics. This is reasonable since the optimization was performed on the given fiber characteristics.

Figure 5A:
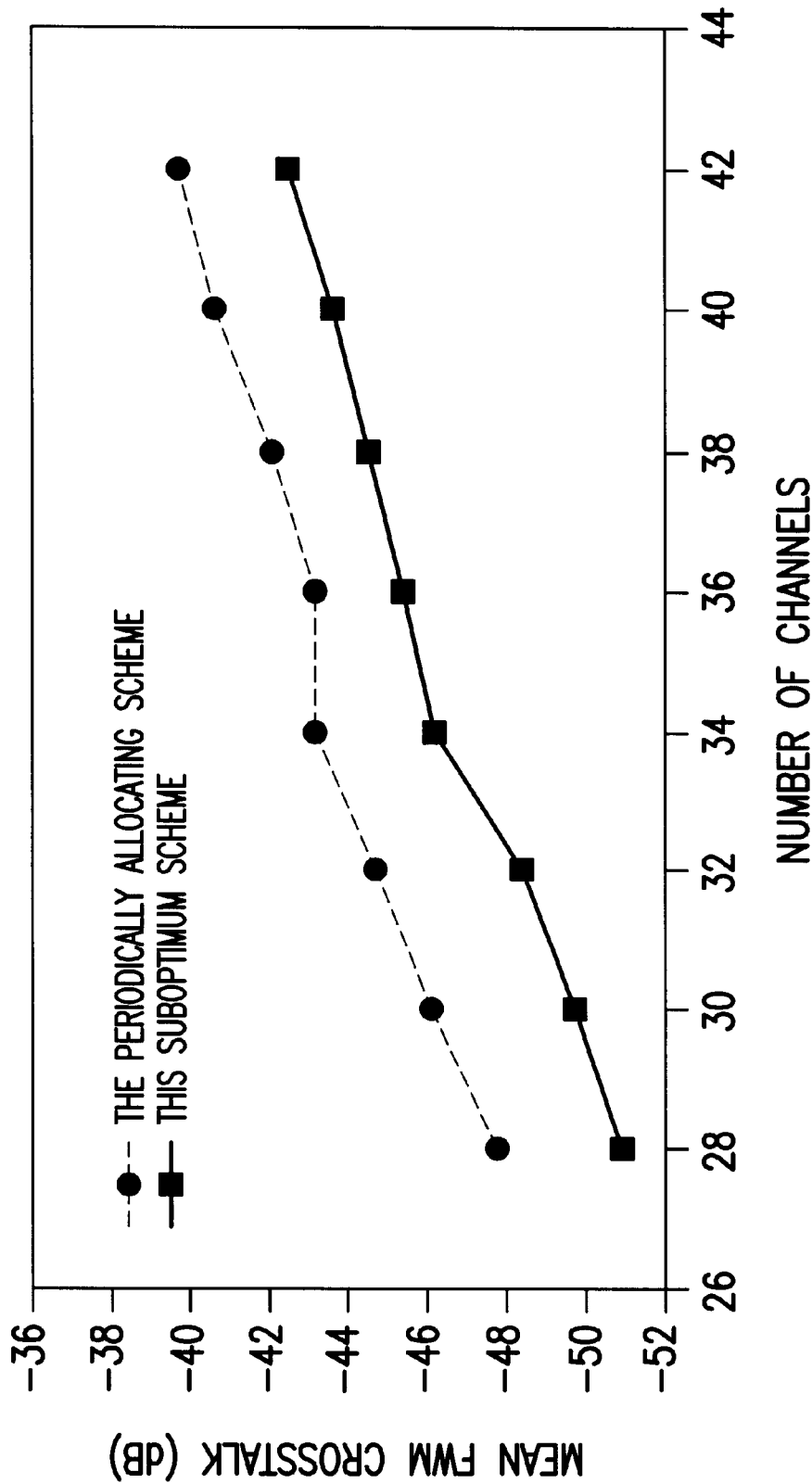
FIG. 5(a) illustrates plots of mean FWM crosstalk vs. wavelength for two different channel plans on a 100 fiber link system.
Figure 5B:
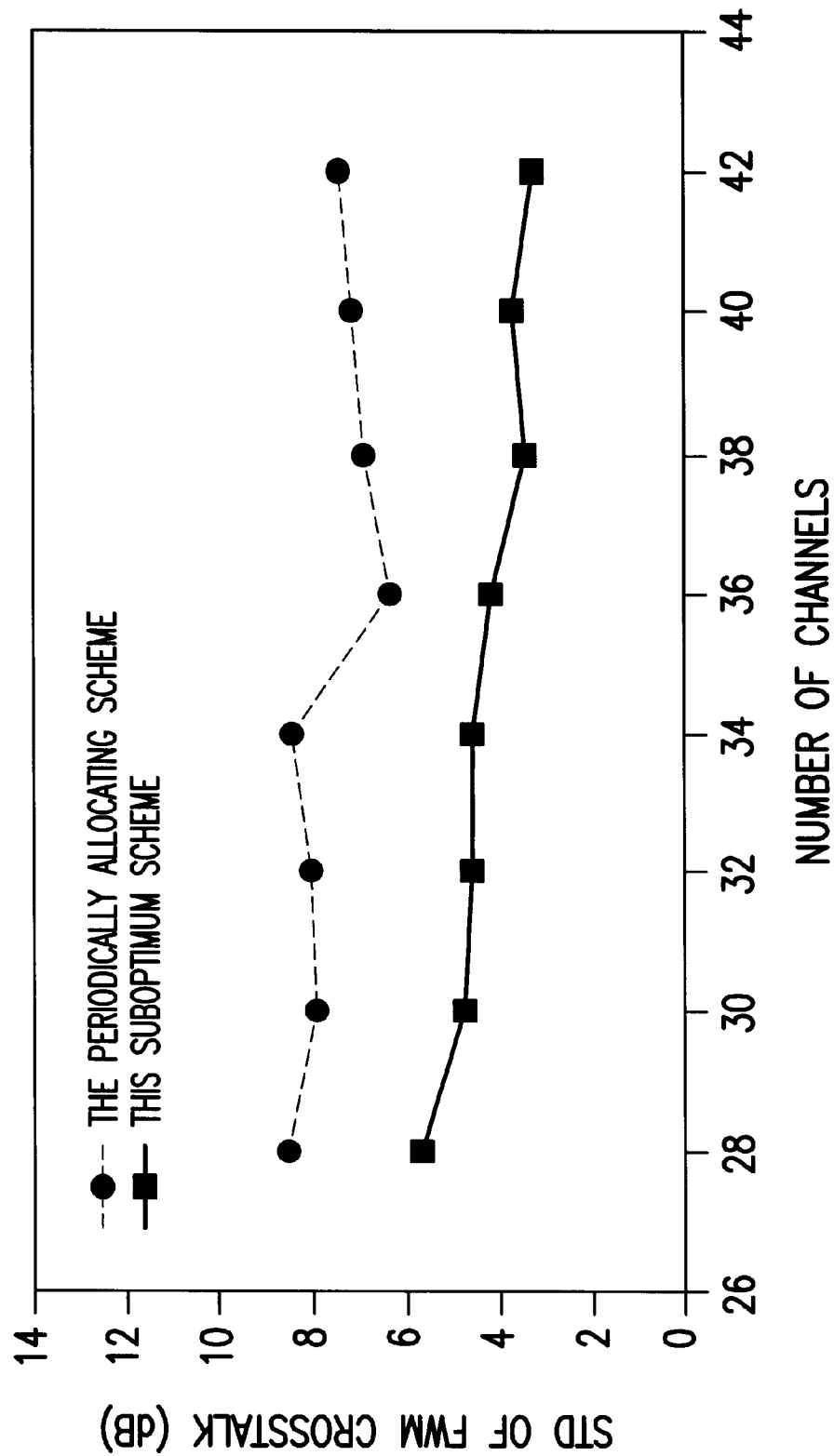
FIG. 5(b) illustrates plots of standard deviation (STD) of FWM crosstalk vs. wavelength for two different channel plans on a 100 fiber link system.
Figure 5C:
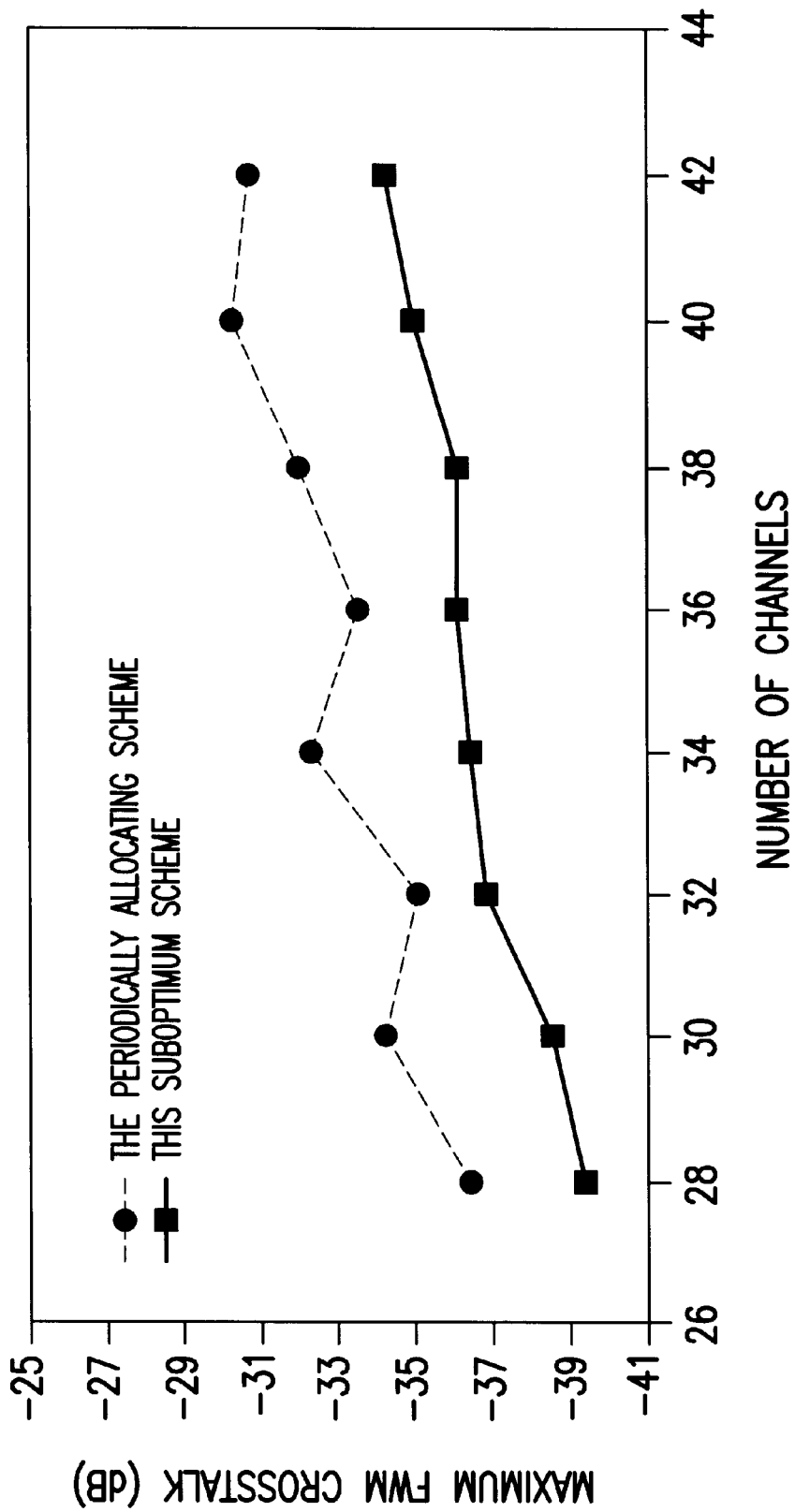
FIG. 5(c) illustrates maximum FWM crosstalk as a function of wavelength for two different channel plans on a 100 fiber link system.

However, the channel plan selected in accordance with the present invention is still better than those from other techniques. FIG. 5 shows the FWM crosstalk for 100 fiber links with random dispersion profiles and system parameters given above. Results corresponding to channel plans for 42, 40, 38, 36, 34, 32, 30 and 28 channels are obtained by using this technique and the periodically allocating techniques in and they are plotted together to make a comparison. FIG. 5(a) shows the mean FWM crosstalk and FIG. 5(b) gives the standard deviations. The maximum FWM crosstalk is plotted in FIG. 5(c). They all clearly show that the present technique still outperforms the periodically allocating method by several dB on FWM crosstalk. Of course, this gain will be increased if more accurate information is known on the fiber link.

Thus, a new technique is provided for selecting channel plans for WDM systems with given channel slots. The technique includes multiple steps with each step minimizing the maximum FWM crosstalk among the channels. Compared with the computer exhaustive search method, this technique dramatically reduced the calculation time. Compared with other channel allocating techniques, it provides better channel plans with several dB advantage on FWM crosstalk depending on the knowledge of the fiber. The advantage can be as large as 10 dB if the fiber parameters can be measured accurately. This technique provides a systematic approach to acquire a channel plan for WDM systems in low dispersion fiber.

Figure 6:
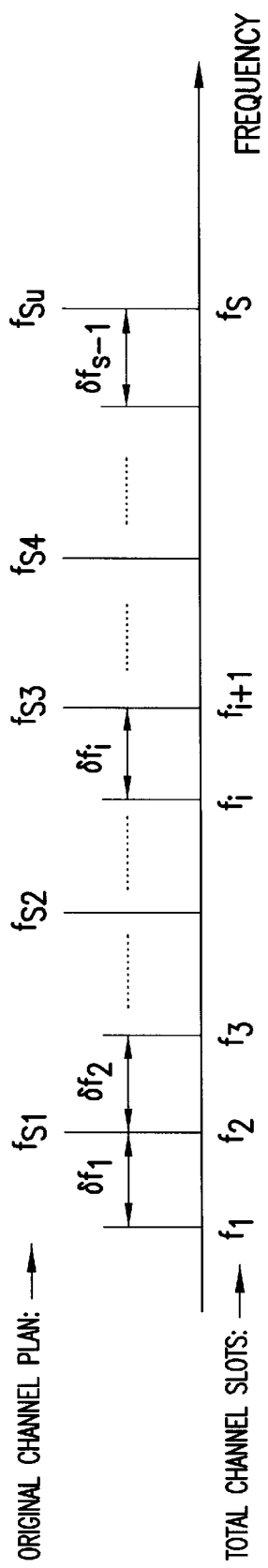
FIG. 6 illustrates an orignal channel plan and the total number of channel slots in a WDM system.

In another embodiment, a technique is used to upgrade an existing channel plan and minimizing the FWM effect. FIG. 6 shows the channel slots in a WDM system with the used and unused slots. The total number of channel slot in the system is S and $S_u$ channel slots are used. The number of remaining channels is $S-S_u$. $\delta f_i$ is the frequency separation between the i-th and the (i+1)-th slot. The first channel frequency is $f_1$ and the channel slots are not necessarily equal spaced. The goal of the channel plan allocating technique is to add as more as possible channels from the available slots with the maximum FWM among these channels is minimized.

The channel allocation scheme consistent with the second embodiment of the present invention can be used in conjunction with a WDM system similar to that shown in FIG. 2 above. Each fiber in this system can have a different dispersion for the non-uniform dispersion case, which is common found in installed fiber. The total number of channels in this system is S as illustrated above, with $S_u$ being the number of existing channel prior to the upgrade. As noted above, it would be desirable to upgrade an existing channel plan to a new channel plan with a given channel number by minimizing FWM crosstalk, or with a given maximum FWM crosstalk but including a maximum number of channels.

As described above, FWM is a nonlinear process in which three optical signals mix together and produce a new frequency product. Again, assuming that three optical signals have frequencies, $f_p$, $f_q$, and $f_r$, then the new FWM product from these three signals has a frequency $f_F$, $$f_F = f_p + f_q - f_r \qquad (13)$$

Time-average power of the FWM product at $f_F$ can be expressed by:

$$P_{FWM} = \frac{1024\pi^6}{n_0^4 \lambda^2 c^2}(D\chi)^2 \frac{P_p P_q P_r}{A_{eff}} \exp(-\alpha L) \cdot \qquad (14)$$

$$\left| \sum_{m=1}^{M} \left\{ \exp\left[ i \sum_{k=1}^{m-1} (\Delta\phi^{(k)}) + i\gamma(P_r^{(ml)} - P_p^{(ml)} - P_q^{(ml)}) \right] \right. \right.$$

$$(m-1)\frac{1-\exp(-\alpha L)}{\alpha} \bigg] .$$

$$\sum_{n=1}^{N} \left\{ \exp\left( \left[ \sum_{j=1}^{n-1} (-\alpha + i\Delta\beta^{(mj)}) L_0 \right] \right. \right.$$

$$\exp\left[ i\gamma(P_r^{(ml)} - P_p^{(ml)} - P_q^{(ml)}) \frac{1-\exp(-\alpha L_0(n-1))}{\alpha} \right] .$$

$$\left. \left. \frac{1-\exp[(-\alpha + i\Delta\beta^{(mn)})L_0]}{\alpha - i\Delta\beta^{(mn)}} \right\} \right\} \right|^2$$

where the parameters are given as following:
- $n_0$—The fiber core refractive index.
- $\lambda$—The wavelength at frequency $f_r$.
- D—The degenerate factor for FWM, D=6 if $p \neq q$, D=3 if $p=q$.
- $\chi$—The third-order nonlinear susceptibility of the fiber.
- $P_p$—The input channel power at frequency $f_p$.
- $P_q$—The input channel power at frequency $f_q$.
- $P_r$—The input channel power at frequency $f_r$.
- $\alpha$—The fiber loss coefficient.
- L—Length of one span.
- M—Number of spans.
- $\Delta\phi^{(k)}$—The phase difference between the four signals ($f_p$, $f_q$, $f_r$, and $f_F$) due to the fiber dispersion.
- $\gamma$—The nonlinear coefficient of the fiber.
- $P_i^{(mn)}$—The signal power to the n-th fiber section in the m-th span for the four signals (i=p, q, r, F).
- N—The number of fiber sections in one span.
- $\Delta\beta^{(mj)}$—The phase match factor at the j-th fiber section of the m-th span.
- $L_0$—Length of one fiber section
- $\Delta\beta'^{(mn)}$—The intensity dependent phase match factor at the n-th fiber section of the m-th span.

The expressions for the phase difference between the four signals ($f_p$, $f_q$, $f_r$, and $f_F$) is given as $$\Delta\phi^{(k)} = \phi_p^{(k)} + \phi_q^{(k)} - \phi_r^{(k)} - \phi_F^{(k)} \qquad (15)$$

where $\phi^{(k)}_i$ (i=p, q, r, F) are the propagation phases at the k-th span for the four signals and written as $$\phi_i^{(k)} = \sum_{n=1}^{N} \beta_i^{(kn)} L_0^{(kn)} \quad (i=p, q, r, F) \qquad (16)$$

with k representing the k-th span. The intensity dependent phase-matching factor for FWM is given as:

$$\Delta\beta'^{(mn)} = \Delta\beta^{(mn)} - \gamma(P_p^{(mn)} + P_q^{(mn)} - P_r^{(mn)})1 - \frac{\exp(-\alpha L_{eff})}{\alpha L_{eff}} \qquad (17)$$

with $\Delta\phi^{(mn)}$ as the phase-matching factor depending only on fiber dispersion and channel spacing and written as $$\Delta\beta^{(mn)} = \frac{2\pi\lambda_r^2}{c} \Delta f_{pr} \Delta f_{qr} \left[ D_c^{(mn)} + \frac{\lambda_r^2}{2c}(\Delta f_{pr} + \Delta f_{qr}) \frac{dD_c^{(mn)}(\lambda_r)}{d\lambda} \right] \qquad (18)$$

where $D_c^{(mn)}$ is the local fiber dispersion and $dD_c^{(mn)}/d\lambda$ is the local dispersion slope in the n-th fiber section of the m-th span. The channel separations, $\Delta f_{pr}$, $\Delta f_{qr}$, are defined as $$\Delta f_{pr} = f_p - f_r,$$

$$\Delta f_{qr} = f_q - f_r. \qquad (19)$$

The power terms, $P_p^{(mn)}$, $P_q^{(mn)}$ and $P_r^{(mn)}$ are the input power to the section n in span m for the three pump signals, respectively.

The nonlinear coefficient of the fiber, $\gamma$, is defined as $$\gamma = \frac{n_2 \omega_1}{c A_{eff}} \qquad (20)$$

where $n_2$ is the nonlinear refractive index of the fiber core, $A_{ff}$ is the effective fiber core area, $\omega$ is the angle frequency of the FWM product, and c is the light speed at free space.

In formulating equation (14), it is assumed that all channels have the same polarization direction. If the channel signals are randomly polarized and independent with each other, the FWM power shall be multiplied by ½ for degenerate mixing products and ⅜ for non-generate mixing products. Also, it has been found that the intensity dependent phase matching for FWM in (14) only becomes significant only when single channel power exceeds 10 dBm. In most real DWDM systems, the channel power is quite below this level. Therefor, the intensity terms in (14) can be neglected in calculations.

By using (14), the FWM power for one product can be calculated and the total FWM $$P_{Ftotal} = \frac{1}{8} \sum_{p \neq q \neq r} P_{FWM}(p, q, r) + \frac{1}{4} \sum_{p=q \neq r} P_{FWM}(p, q, r) + \qquad (21)$$

$$\frac{1}{4} \sum_{p \neq q \neq r = F} P_{FWM}(p, q, r).$$

power to one channel is the sum of the power from all the FWM products falling onto that channel, i.e., The FWM crosstalk in the s-th channel in the WDM system is defined as the ratio of total FWM product power to the signal power in that channel, $$C^{(s)} = \frac{P_{total}}{P^{(s)}} \quad (22)$$

An objective of the channel plan upgrading technique consistent with the present invention is to minimize this crosstalk while selecting as many additional channels as possible.

Given the total number of channel slots in the system and other system parameters, the channel upgrading objectives are: (a) including the original channels; (b) selecting channels from given channel slots; (c) meeting the final goal: a channel plan with a specified number of channels, Sc, or with a specified maximum FWM crosstalk, $C_c$. The process of channel allocation is given as follows:

Step 1. Calculate the FWM power matrix using formula (14). The FWM power matrix is defined as $$P_{matrix}(p, q, r) = P_{FWM}(f_p, f_q, f_r), (p, q, r = 1, 2, \ldots, S). \quad (23)$$

It is a three dimensional matrix and includes all possible combination between any three channels.

Step 2. Add one channel from the available channel slot to the existing channel plan to form a new channel plan. S-$S_u$ channel plans can be formed since there are S-$S_u$ channel slots available. Using the FWM power matrix to calculate the FWM crosstalk to all the channel plans and select the maximum FWM crosstalk from each of these channel plan and form a maximum FWM crosstalk vector: $C^{(1)}, C^{(2)}, \ldots, C^{(S-Su)}$. Since the FWM crosstalk is calculated by table look-up method form the FWM power matrix, the computation time is dramatically decreased compared with calculation directly from formula (14).

Step 3. Select the channel plan with the minimum FWM crosstalk value in the crosstalk vector $C^{(1)}, C^{(2)}, \ldots, C^{(S-Su)}$ and take the channel plan corresponding to this FWM crosstalk as the new channel plan. That is, if $$C_{min} = \min(C^{(1)}, C^{(2)}, \ldots, C^{(S-Su)}) = C^{(i)} \quad (24)$$

then the i-th channel plan is selected and the new channel plan is $$f_1, f_2, \ldots, f_n, f_a, f_{n+1}, \ldots, f_{Su}.$$

Where $f_a$ is the newly added channel between the existing channels n and n+1.

Step 4. Check the maximum FWM crosstalk and the number of channels in the new channel plan. If the maximum FWM crosstalk exceeds the given limit, or the number of channels in the new channel plan exceeds the specified number of channels, then go to next step. Otherwise, go back to step 3. The process is given as:
If $$Su+1 = S_c \quad (25)$$

or $$C_{min} = \text{Min}(C^{(1)}, C^{(2)}, \ldots, C^{(S-Su)}) \geq C_c, \quad (26)$$

Go to Step 5. Otherwise, go to Step 3 with Su=Su+1.

Step 5. The new channel plan channels are the final channel plan:

$$f_1, f_2, \ldots, f_{Sc},$$

which is optimized to the FWM crosstalk. This channel plan can be evaluated for different fiber characteristics.

Since this technique adds channels with minimum FWM crosstalk in each optimizing step, the obtained channel plan is further optimized in each step, though it may not be completely optimized as all steps combined. Accordingly, the obtained channel plan is sub-optimal. In this technique, however, the calculation time is dramatically reduced compared with the exhaustive computer search. Using the example given above can make a simple comparison. Upgrading from an 11 channel plan to a 32 channel plan in a 96-channel WDM system requires about 1120 FWM crosstalk calculations using the technique consistent with the present invention, while the number of calculations is 4.35× $10^{19}$ when the exhaustive search method is used. This difference is significant.

Applying this channel-upgrading technique to an exemplary DWDM system with 96 channel slots, where the old channel plan has 11 channels and an objective is to get a channel plan with 32 channels. The system parameters are as follows:

Available channel slots: 96

Channel spacing: 50 GHz

The first-channel frequency: 191.5 THz

The existing 11 channels: [1, 2, 5, 11, 22, 39, 67, 81, 89, 94, 96]

Span power budget: 6×20 dB (six span with 20 dB each span, −8.5 dBm/ch)

Fiber type: dispersion-shifted fiber (DSF)

Average zero-dispersion wavelength: 1550 nm

Average dispersion slope: 0.07 ps/km-nm$^2$

Fiber effective core area: 50 $\mu$m$^2$

Fiber nonlinear index: 2.6×10$^{-20}$ m$^2$/W

To characterize the non-uniformity of the fiber dispersion, a random zeros-dispersion wavelength and a random dispersion slope are assumed for each fiber section. The distribution function is Gaussian distribution. The standard deviation of the zero-dispersion wavelength is 2 nm. The standard deviation of dispersion slopes is ten percent of the average dispersion slope. Given the zero-dispersion wavelength and the dispersion slope in each fiber section, the dispersion at each channel can be calculated by using $$D(\lambda) = D_0 + (\lambda - \lambda_0) D_{slope} \quad (27)$$

where $D_0$ is the fiber dispersion at wavelength $\lambda_0$ and $D_{slope}$ is the dispersion slope $\lambda$. Other system and fiber parameters can also be non-uniform along the link and the channel allocating techniques has no limitation on these parameters. But here, for simplicity, it is assumed the remaining parameters are uniform.

Figure 7:
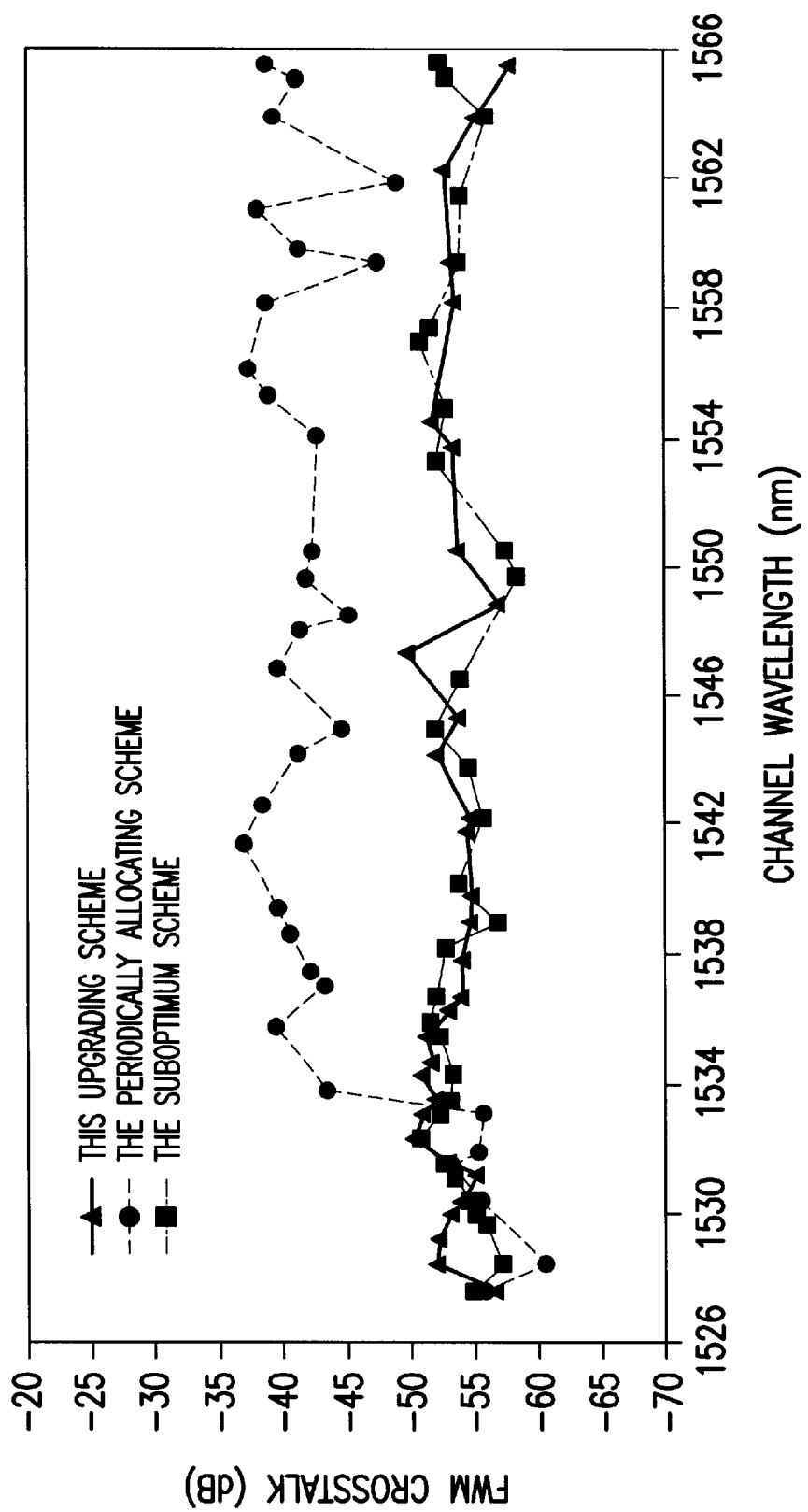
FIG. 7 illustrates plots of FWM crosstalk vs. wavelength for different channel plans.

FIG. 7 gives the channel plan with 32 channels plus the FWM crosstalk levels for each channel. The other two curves corresponds to the channel plans obtained by using the periodically allocating scheme and the sub-optimum scheme, respectively, where the channel plans are directly selected from all 96-channel slots assuming no upgrading needed. FIG. 7 shows that the performance of this channel-plan upgrading technique is close to the sub-optimum non-upgrading scheme and almost 10 dB better than the periodically allocating technique. Comparing the FWM crosstalk levels among channels in the channel plan, the FWM crosstalk among channels is substantially flat. This is similar to the sub-optimum channel-allocating algorithm presented and is superior to the periodically allocating scheme from the optimization prospective. This also partly explains the mechanism behind this technique in optimizing the FWM crosstalk, that is, minimizing the maximum FWM crosstalk, not FWM crosstalk in every channel. This is reasonable since the system performance is limited by the maximum FWM crosstalk. However, this channel plan is optimized under the given fiber though its dispersion is randomly distributed. In actual situations, the full knowledge of the fiber may not be available, especially the dispersion profile along the link. Accordingly, further evaluation may be required under these circumstances.

Figure 8:
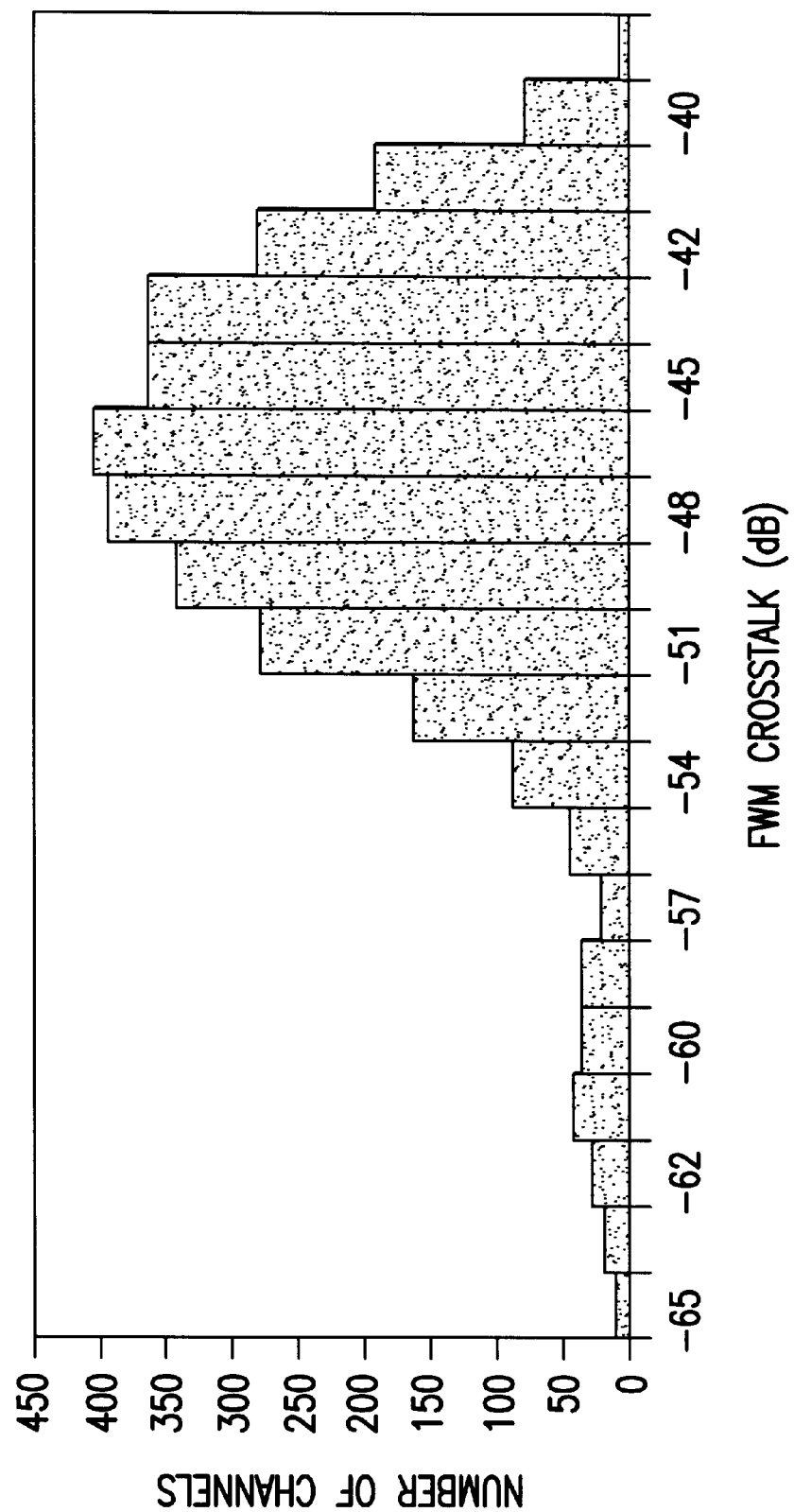
FIG. 8 is a histogram plot of FWM crosstalk for a channel plan consistent with a furher aspect of the present invention for a 100 fiber link system.
Figure 9A:
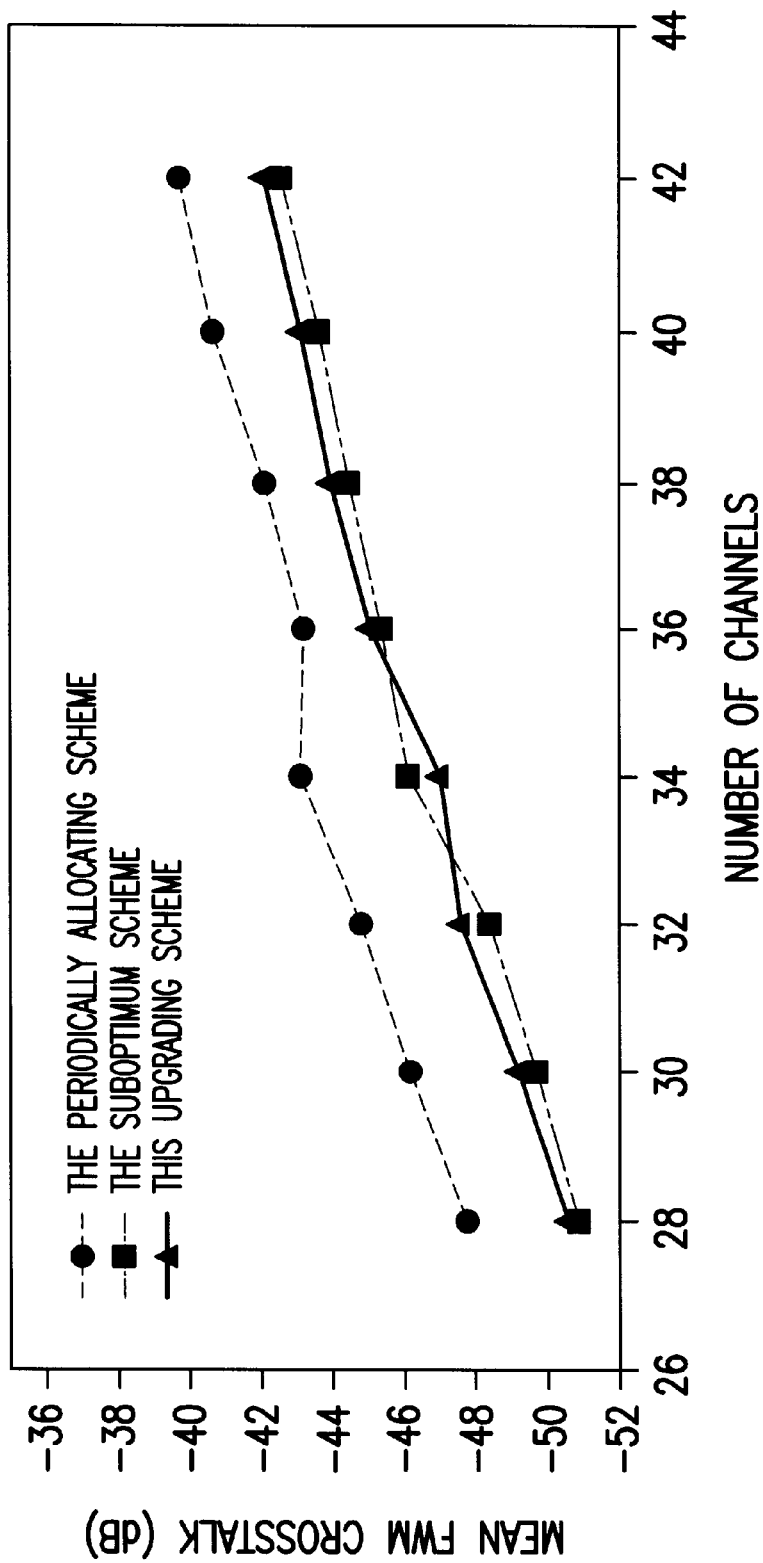
FIG. 9(a) illustrates plots of mean FWM crosstalk vs. wavelength for three different channel plans on a 100 fiber link system.
Figure 9B:
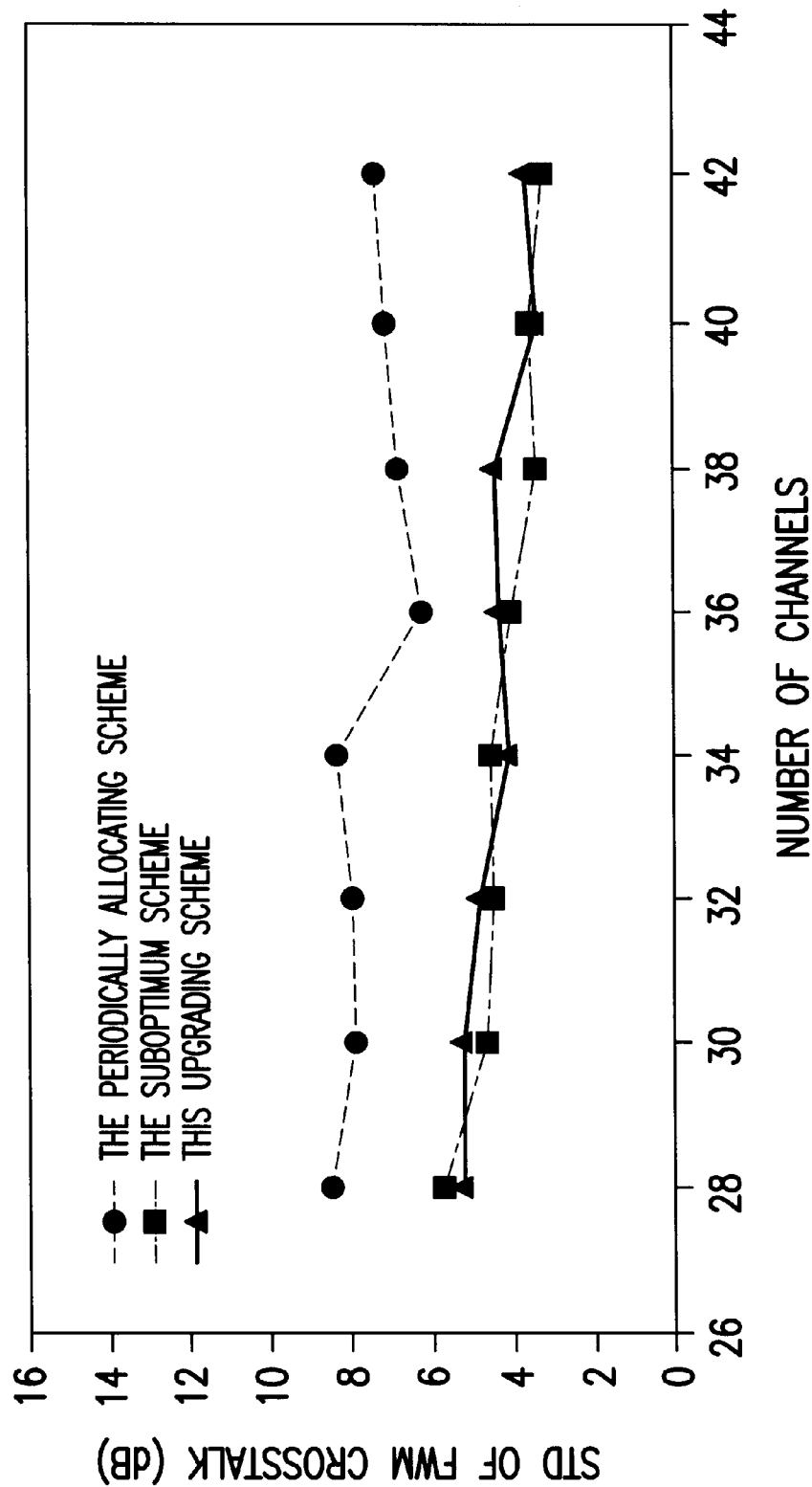
FIG. 9(b) illustrates plots of standard deviation (STD) of FWM crosstalk vs. wavelength for three different channel plans on a 100 fiber link system.
Figure 9C:
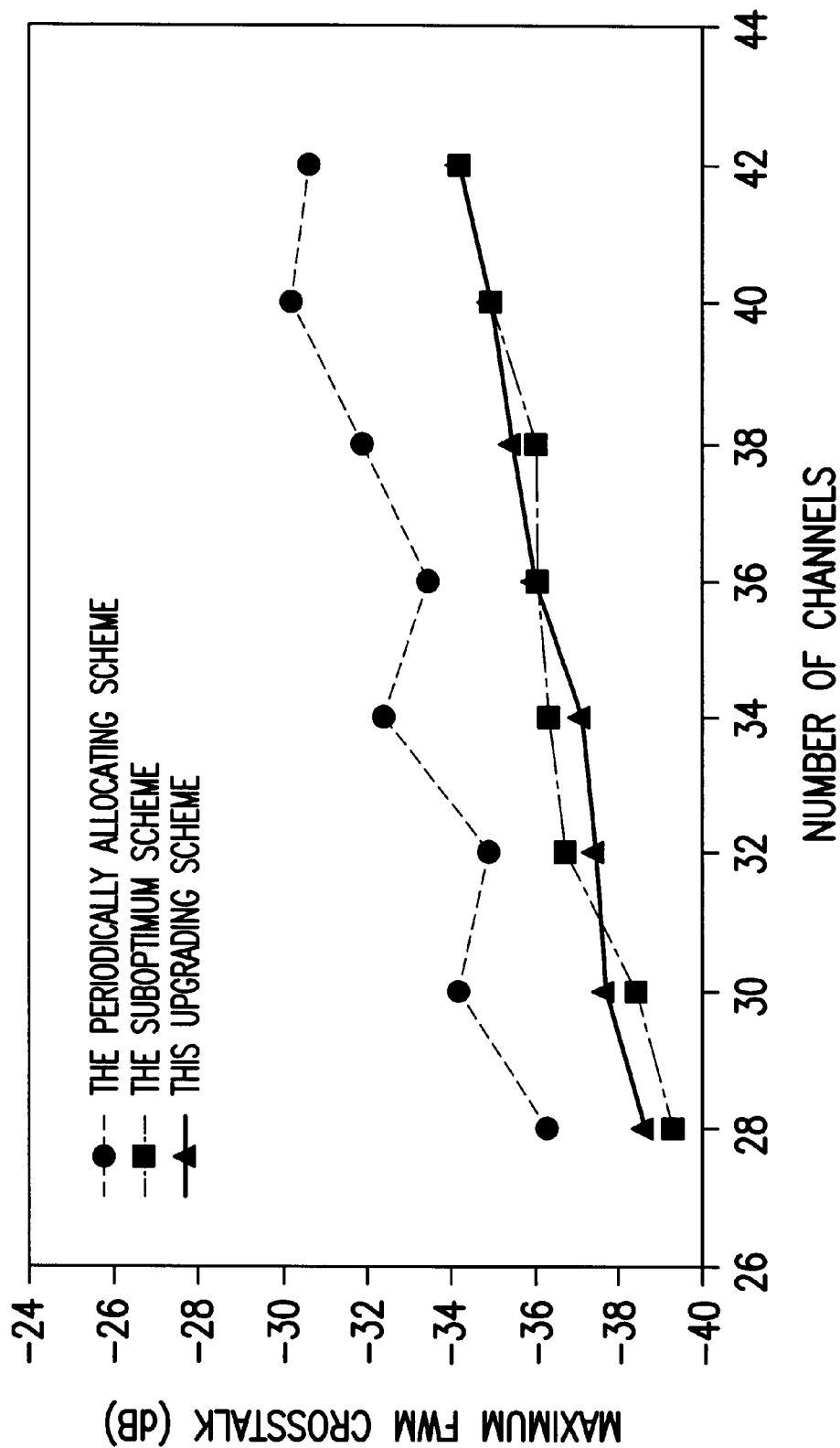
FIG. 9(c) illustrates maximum FWM crosstalk as a function of wavelength for two different channel plans on a 100 fiber link system.

This channel plan is applied to a system having 100 DSF links, each with the same system parameters as above except the fiber zero-dispersion wavelength and dispersion slope, which are set randomly in a Gaussian distribution. For the zero-dispersion wavelength, the mean is 1550 nm and standard deviation is 2 nm. For dispersion slope, the mean is 0.07 ps/km-nm and standard deviation is ten percent of the mean. The FWM crosstalk for all the fiber links (trials) is plot as a histogram, given in FIG. 8. As expected, the maximum FWM crosstalk is increased for some fibers though the average value for the entire fiber is close to the optimized maximum FWM crosstalk level. It means that the channel plan obtained by using this technique is sensitive to fiber characteristics. However, the channel plans obtain by using this upgrading scheme is still better than the periodically allocation scheme for different fibers. FIG. 9 show shows the comparison for selecting different channel plans from 96 available channel slots. This upgrading scheme obtained the channels plans by upgrading from a zero-FWM channel plan. The other two schemes obtained their channel plans from all available 96-channel slots. FIG. 9(*a*) and FIG. 9(*b*) show the mean and standard deviation of FWM crosstalk, respectively, for all 100 fibers. FIG. 9(*c*) shows the maximum FWM crosstalk vs. the number of channels. The results show that this upgrading scheme has a similar performance with the sub-optimum scheme, but better than the periodically allocating scheme.

Figure 10A:
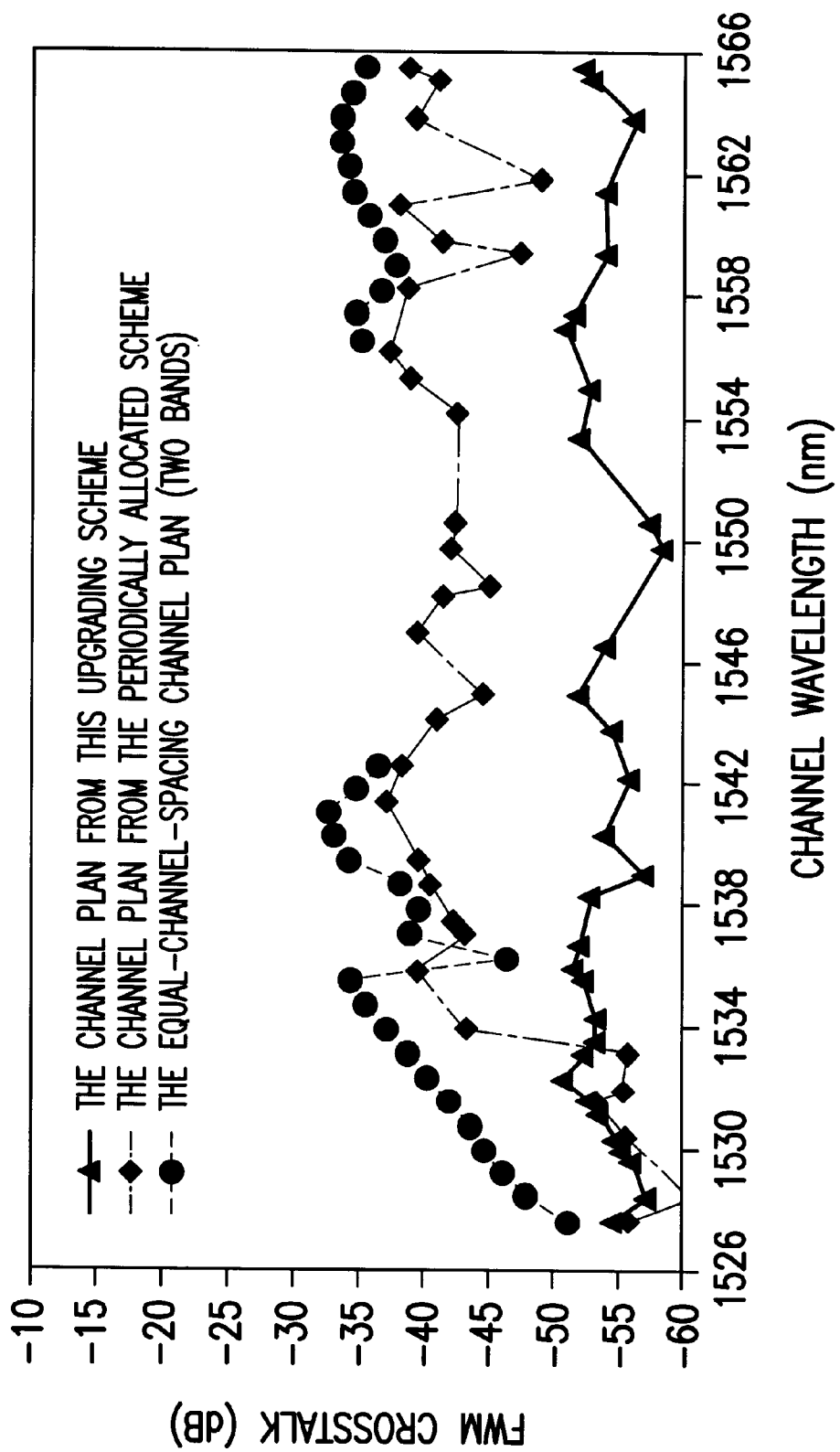
FIG. 10(a) illustrates plots of FWM crosstalk vs. wavelength for three different upgraded 32 channel plans.
Figure 10B:
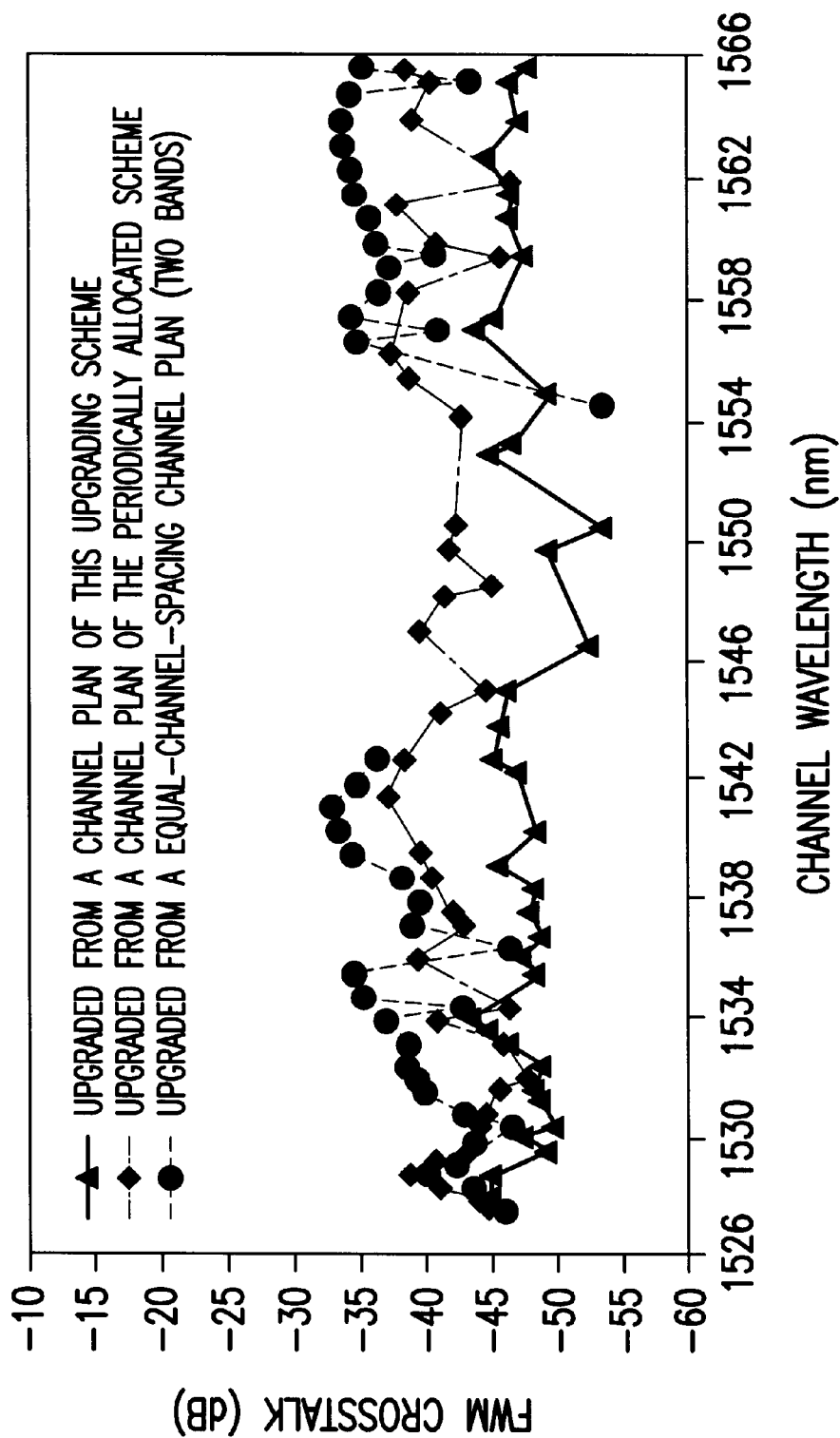
FIG. 10(b) illustrates plots of FWM crosstalk vs. wavelength for three different upgraded 32 channel plans.

Another important aspect about channel upgrading is that the performance of the upgraded new channel plans also depends on the old channel plans. FIG. 10 shows the FWM crosstalk for upgrading to three 40-channel plans from three 32-channel plans obtained from three different schemes. All three-channel plans are obtained from 96 channel slots. The system and fiber parameters are the same as above. The first 32-channel plan is an equally spaced channel plan. This channel plan is located in two bands to avoid the zero-dispersion region. The channel spacing is two times the channel slot separation. The second 32-channel plan is obtained from the periodically allocating scheme. The third 32-channel plan was obtained from this upgrading scheme presented above. The FWM crosstalk for the 32-channel plans before upgrading is shown in FIG. 10(*a*). FIG. 10(*b*) gives the results for the new 40-channel plans after upgrading. The results show that a worse performance of an old channel plan results in worse performance for the new channel plan. It also show that the upgrading scheme add channels at locations with least FWM crosstalk. The maximum FWM crosstalk does not increase for the first two channel plans before and after upgrading. However, even after upgrading, the maximum FWM crosstalk in these two cases is still higher than the third case because the maximum FWM crosstalk in the original channels is too high. Therefore, the difference in the performance of the old channel plans may determine whether to upgrade the channel plans or to completely replace them with new channel plans. The technique presented here provides a measure on the decision. Also the results implicates that it is important to select a right channel plan at the beginning. Otherwise, penalty has to be taken later in trying to increase capacity through adding channels.

Thus, a new technique is provided for upgrading channel plans for WDM systems by including the original channel plan as a subset. The technique is composed of multiple steps with each step minimizing the maximum FWM crosstalk among the channels by including the fiber characteristics. Compared with the computer exhaustive search method, this technique dramatically reduces calculation time. It provides a systematic approach to upgrade a channel plan with reasonable calculation effort for WDM systems in low dispersion fiber.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. A method for allocating optical channels in a WDM system, comprising the steps of:

determining a four wave mixing (FWM) power matrix for an initial channel plan, said initial channel plan including a plurality of optical channels;

determining FWM crosstalk for each of said plurality of optical channels based on said FWM power matrix;

selecting one of said plurality of optical channels having a maximum level of FWM crosstalk, and dropping said one of said plurality of optical channels from said initial channel plan to thereby obtain a new channel plan;

determining FWM crosstalk for each of said plurality of optical channels in said new channel plan;

selecting one of said plurality of optical channels in said new channel plan having a maximum FWM crosstalk value; and determining whether said maximum FWM crosstalk value exceeds a predetermined acceptable level.

2. A method in accordance with claim 1, further comprising a step of assigning channels in accordance with said new channel plan if said maximum crosstalk value falls below said predetermined acceptable level.

3. A method for allocating optical channels in a WDM system, comprising the steps of:

determining a four wave mixing (FWM) power matrix for an initial channel plan, said initial channel plan including a plurality of optical channels;

determining FWM crosstalk for each of said plurality of optical channels based on said FWM power matrix;

selecting one of said plurality of optical channels having a maximum level of FWM crosstalk, and dropping said one of said plurality of optical channels from said initial channel plan to thereby obtain a new channel plan; and determining whether a number of channels in said new channel plan is greater than a predetermined number of channels.

4. A method in accordance with claim 3, further comprising a step of assigning channels in accordance with said new channel plan if said number of channels in said new channel plan is greater than said predetermined number.

5. A method for allocating optical channels while upgrading an existing channel plan in a WDM system, comprising the steps of:

determining a four wave mixing (FWM) power matrix for an initial channel plan;

adding an available channel slot to said initial channel plan to thereby obtain a new channel plan, said available channel slot being unoccupied by any channels associated with said existing channel plan;

determining FWM crosstalk for each said initial channel plan and said new channel plan;

determining which of said initial channel plan and said new channel plan has a minimum level of FWM crosstalk;

selecting one of said initial channel plan and said new channel plan in accordance with said step of determining which of said initial channel plan and said new channel plan has a minimum level of FWM crosstalk; and determining whether said minimum level of FWM crosstalk exceeds a predetermined limit.

6. A method in accordance with claim 5, further comprising the step of assigning channels in accordance with said selected channel plan if said minimum level of FWM crosstalk is below a predetermined level.

7. A method for allocating optical channels while upgrading an existing channel plan in a WDM system, comprising the steps of:

determining a four wave mixing (FWM) power matrix for an initial channel plan;

adding an available channel slot to said initial channel plan to thereby obtain a new channel plan, said available channel slot being unoccupied by any channels associated with said existing channel plan;

determining FWM crosstalk for each said initial channel plan and said new channel plan;

determining which of said initial channel plan and said new channel plan has a minimum level of FWM crosstalk;

selecting one of said initial channel plan and said new channel plan in accordance with said step of determining which of said initial channel plan and said new channel plan has a minimum level of FWM crosstalk; and determining whether a number of channels in said selected channel plan exceeds a predetermined value.

8. A method in accordance with claim 7, further comprising the step of assigning channels in accordance with said selected channel plan if said number of channels in said selected channel plan exceeds said predetermined value.

* * * * *